US012489929B2

United States Patent
Calleja (10) Patent No.: US 12,489,929 B2
(45) Date of Patent: Dec. 2, 2025

(54) LIVE STREAMING TECHNOLOGIES

(71) Applicant: GlobalM SA, Meyrin (CH)

(72) Inventor: Paul Calleja, Geneva (CH)

(73) Assignee: GlobalM SA, Geneva (CH)

( * ) Notice: Subject to any disclaimer, the term of this patent is extended or adjusted under 35 U.S.C. 154(b) by 0 days.

(21) Appl. No.: 18/707,843

(22) PCT Filed: Nov. 7, 2022

(86) PCT No.: PCT/EP2022/080937
§ 371 (c)(1),
(2) Date: May 6, 2024

(87) PCT Pub. No.: WO2023/079133
PCT Pub. Date: May 11, 2023

(65) Prior Publication Data
US 2024/0430489 A1    Dec. 26, 2024

(30) Foreign Application Priority Data

Nov. 8, 2021    (EP) .................................... 21206966

(51) Int. Cl.
| H04N 21/2187 | (2011.01) |
| H04N 21/258 | (2011.01) |
| H04N 21/61 | (2011.01) |

(52) U.S. Cl.
CPC ... *H04N 21/2187* (2013.01); *H04N 21/25841* (2013.01); *H04N 21/6125* (2013.01)

(58) Field of Classification Search
CPC ......... H04N 21/2187; H04N 21/25841; H04N 21/6125
See application file for complete search history.

(56) References Cited

U.S. PATENT DOCUMENTS

| 2011/0219114 A1* | 9/2011 | Yang ................... H04L 61/4535 |
| | | 709/224 |
| 2016/0308958 A1 | 10/2016 | Navali et al. |
| 2020/0280448 A1* | 9/2020 | Ithal ..................... H04L 9/3242 |

FOREIGN PATENT DOCUMENTS

EP    3318047 B1    12/2020

OTHER PUBLICATIONS

International Search Report and Written Opinion, dated Jan. 26, 2023, for corresponding International Application No. PCT/EP2022/080937.

Moon Seonghoon et al., "On the Impact of Layer-Splitting for Cloud-Based SVC Streaming," 2014 International Conference on Future Internet of Things and Cloud, IEEE, Aug. 27, 2014, pp. 210-215, Barcelona, Spain.

(Continued)

*Primary Examiner* — Nnenna N Ekpo
(74) *Attorney, Agent, or Firm* — Build IP, LLC; Robert V. Donahoe (57) ABSTRACT

The current invention relates to a live broadcasting system comprising at least one media capture device in communication with an encoder, which encoder is in further communication with a plurality of cloud-based pods and a control module configured to manage said pods. Each pod is functionally reconfigurable and can function as a stream receiver, stream sender or transcoder. The system is also reached by a method of broadcasting a live stream.

24 Claims, 8 Drawing Sheets

(56) References Cited

OTHER PUBLICATIONS

Zixia Huang et al., "Cloudstream: Delivering high-quality streaming videos through a cloud-based SVC proxy," INFOCOM, 2011 Proceedings IEEE, IEEE, Apr. 10, 2011, pp. 201-205, Shanghai, China.

International Preliminary Report on Patentability, dated Oct. 4, 2023, for corresponding International Application No. PCT/EP2022/080937.

* cited by examiner

LIVE STREAMING TECHNOLOGIES

FIELD OF THE INVENTION

The present invention relates to a broadcasting system. In particular, the present invention relates to a live streaming system.

BACKGROUND

The ever-increasing demand for higher quality live streams is driving the need for better networking infrastructures, especially when disseminating content over highly congested areas, such as stadiums, concerts and museums. Traditional approaches to handle this type of scenario rely on a combination of cellular data, through 4G distributed antenna arrays (DAS), with a high count of WiFi (802.11) access points. This obviously requires a substantial upfront cost for equipment, planning and deployment.

WO2020255040 discloses an approach that combines secure distributed systems, WiFi multicast, erasure coding, source coding and opportunistic offloading that makes use of hyperlocal mobile edge clouds. This document discloses the use of multiple servers serving specific geographical regions. Said servers are in further communication with edge servers in order to reduce latency.

US2020260125 discloses a method for a load balancing layer. Said method includes: receiving a live broadcast request from a terminal, the live broadcast request including an up-streaming request or a down-streaming request; selecting a streaming media server from a plurality of streaming media servers; and forwarding the live broadcast request to the selected streaming media server to cause the selected streaming media server to provide a live broadcast service according to the broadcast request.

It is widely known to those skilled in the art that content demand can vary substantially, even in small geographic regions. While the aforementioned documents attempt to address this problem, the systems and system management methods disclosed therein still lack the necessary flexibility to cope with such high variations.

US20110219114 discloses a pod-based server backend infrastructure for peer-assisted applications. The disclosed system and method rely solely on the increment and reduction of pods and the nodes contained therein in order to adjust the capacity of the system. Furthermore, the communication possibilities between each pod are severely reduced, resulting in lower system flexibility.

USUS20160308958 discloses a method, system and non-transitory computer-readable medium for distributing adaptive bitrate (ABR) media. While the system disclosed in US '958 is capable of scalable capacity, said scalability is attained by means of the additions and subtraction of individual low level network resources. This precludes the creation of a low-level resource buffer that can cope with spikes in demand.

There remains a need in the art for an improved system which incorporates sufficient flexibility to adapt to sharp changes in content demand. Accordingly, a need arises also for a method capable of materializing all the potential flexibility built into such systems.

SUMMARY OF THE INVENTION

The present invention and embodiments thereof serve to provide a solution to one or more of above-mentioned disadvantages. To this end, the present invention relates to a live streaming system according to claim 1.

Preferred embodiments of the system are described and claimed herein. The system comprises video capture and encoding elements, which encoding elements are in a two-way communication with a number of cloud-based reconfigurable service pods. The pods are arranged in terms of geographical zones and according to demand. The system can be advantageously scaled and reconfigured.

In a second aspect, the present invention relates to a method of broadcasting live stream using a cloud-based live broadcasting system in combination with a media capture device in communication with an encoder. Preferred embodiments of the method are described and claimed herein. The method advantageously permits managing the system such that video quality and demand are met without excessive latency and resources used.

DESCRIPTION OF FIGURES

The following description of the figures of specific embodiments of the invention is merely exemplary in nature and is not intended to limit the present teachings, their application or uses. Throughout the drawings, corresponding reference numerals indicate like or corresponding parts and features.

DETAILED DESCRIPTION OF THE INVENTION

The present invention concerns a live broadcasting system and a method of using said system.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention provides a live broadcasting system comprising at least one media capture device in communication with an encoder, which encoder is in further communication with a plurality of streaming resources and a control module configured to manage said streaming resources, characterized in that, said resources are cloud-based pods, pods are arranged in nodes, said nodes having a limited number of pods, each of which pods being functionally reconfigurable to function as a stream receiver, a stream sender or as a transcoder, the function assigned to a pod is controlled by a stream service controller. This advantageously permits a low-level management of the functions assigned to each pod. This advantageously permits reconfiguring the system without having to add or remove any of its elements. An advantage is that small changes in demand may be addressed by reconfiguring pods instead of immediately scaling the number of resources in the system. By preference, the encoder is a fixed bitrate encoder. More preferably, the encoder is a variable bitrate encoder.

In this context, the term "pod" is to be understood as a point-of-deployment within a network. Each pod is a network element comprising a plurality of pieces of service network equipment, including hardware and software that communicatively interconnects other equipment on a network.

In this context, the term "node" is to be understood as a group of pods. From its creation to its extinction, a node maintains the same number of pods. Newly created nodes always include redundant pods.

In this context, the term "limited number of pods" is to be understood as fixed number of pods. More preferably, nodes are grouped in scalable clusters. In this way, any time a new node is created, new nodes with redundant pods are introduced into the system. This advantageously allows the system to stay ahead of demand. Preferably, clusters are distributed according to a number of regional zones. This permits a more efficient monitoring and meeting of local demand. In periods of less traffic, nodes can be removed, thereby freeing resources, which resources can be used to serve other geographical areas.

In a further or another embodiment, a first pod in the cloud is configured to function as a stream receiver. Said first pod is configured to receive an encoded signal and distribute said signal among a plurality of pods configured as senders.

In a further or another embodiment, the control module comprises an application programming interface (API), which API is in communication with a Service Orchestration System. Preferably, the Service Orchestration System communicates with the stream service controller of each pod. Still more preferably, the Service Orchestration System is able to scale the number of nodes within each cluster. This allows for a device to have full control of all hierarchical levels of the system, which permits close control of both function allocation to nodes as well as adjusting the capacity of the system in function of demand. By preference, all levels of the system can be manually controlled and monitored. More preferably, control of any level of the system is automated.

Another aspect of the invention relates to a method of broadcasting live stream comprising the steps of:
  a. Capturing one or more video stream at a live event;
  b. Encoding said video stream;
  c. Sending the encoded video stream to a first stream receiver pod via a local internet router;
  d. distributing the encoded video stream received by the first stream receiver pod through a plurality of stream sender pods in each availability zone cluster in multiple geographical zones;
  e. adjusting the number of nodes per cluster;
  f. distributing the encoded video to a plurality of stream clients in each availability zone within each geographical zone;
  g. adjusting encoding bitrate; and
  h. adjusting latency.

In a further or another embodiment, the number of nodes in a cluster is adjusted according to the number of clients. By preference, a new node is started in a cluster when said cluster is reaching its limit. In this way, sufficient sender pods are always made available to meet the demand. Also by preference, inactive nodes are removed from a cluster.

In a further or another embodiment, the encoder communicates with a local internet router directly via internet and/or a 4G/5G network with internet backhaul, which regional internet router is in further communication with a first stream receiver. When using a mobile device to capture and transmit video to a regional internet router, the use of internet backhaul advantageously permits maintaining fast transmission of large volumes of data. This permits reducing latency whether communication is being carried out wirelessly or via cable.

In this context, "Internet backhaul" is defined as a portion of the network which comprises intermediate links between the core network and small sub-networks at the edge of said network. In mobile networks, said small sub-networks are cell sites.

Spawning pods advantageously permits maintaining stream quality and latency. The spawning of pods can continue into multiple generations without jeopardizing stream quality or reliability. This advantageously permits global scalability of the service. In a further or another embodiment, stream sender pods are spawned when a client disconnects from said stream sender pod. This permits maintaining transmission to other clients whose stream depends on said stream sender pods.

In a further or another embodiment, latency values are calculated by the first stream receiver based on actual received bandwidth. By preference, latency is calculated between the stream receiver and sender pods as an Internet control message protocol round trip time (RTT) calculation between the stream receiver and sender pods. More preferably, this calculation is made in advance of the stream starting and stored in a table. The latency is considered to be four times the measured round-trip time. This advantageously ensures that the encoder is sending the right video bit rate through the network and not just what is being measured on the encoders own network adapter.

The invention is further described by the following non-limiting examples which further illustrate the invention, and are not intended to, nor should they be interpreted to, limit the scope of the invention.

EXAMPLES AND/OR DESCRIPTION OF FIGURES

With as a goal illustrating better the properties of the invention the following presents, as an example and limiting in no way other potential applications, a description of a system for live streaming and a method of managing the same.

Figure 1:
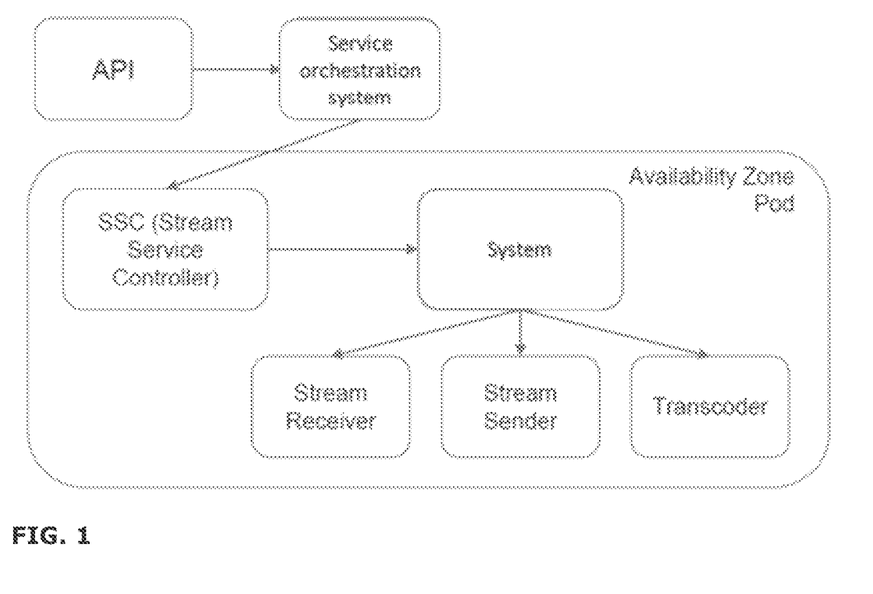
FIG. 1 shows the architecture of an availability zone pod and the elements of the system with which it communicates.

FIG. 1 shows the architecture of an availability zone pod and the elements of the system with which it communicates. The Availability zone Pod is shown comprising a stream service controller in communication with a system, which system can be configured to perform one of three services: stream receiver, stream sender or transcoder. The stream service controller is in further communication with a service orchestration system, which system is external to the availability zone pod. The service orchestration system is further connected with an application programming interface (API).

Figure 2:
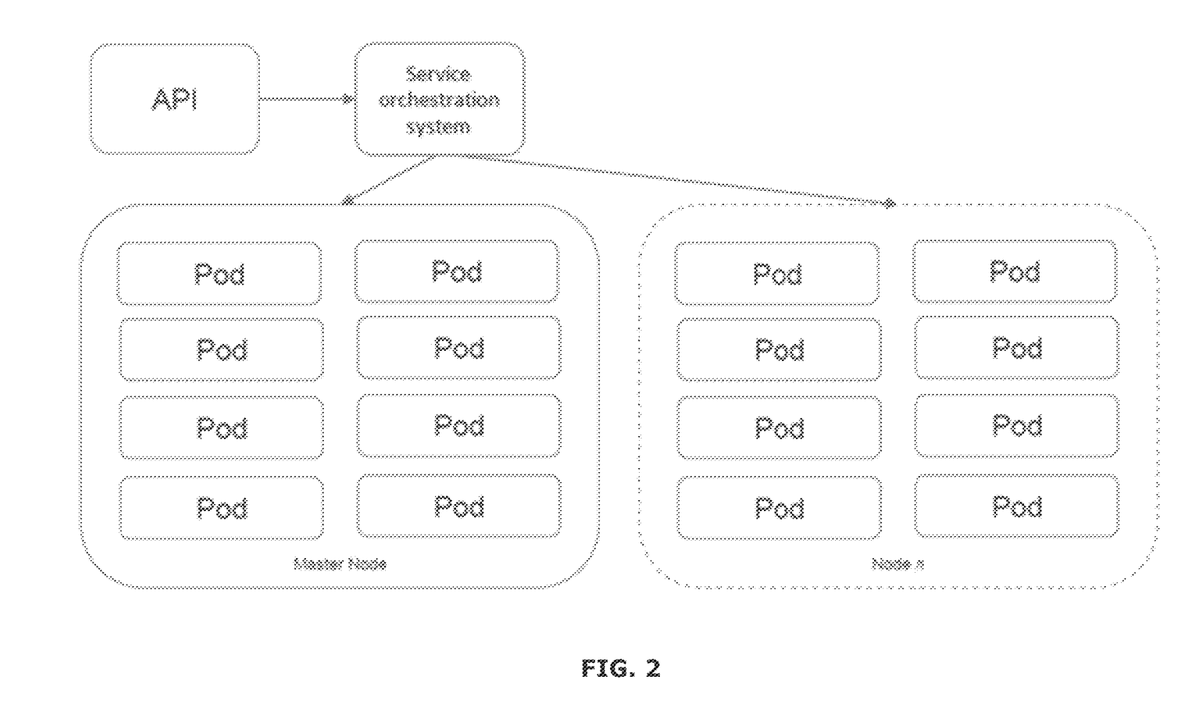
FIG. 2 shows the structure of a cluster.

FIG. 2 shows the structure of a cluster. The cluster is shown comprising a master node and a node n, each of which nodes further comprises a number of pods. The nodes in the cluster are shown further connected to the service orchestration system, which system is shown in further connection with the API.

Figure 3:
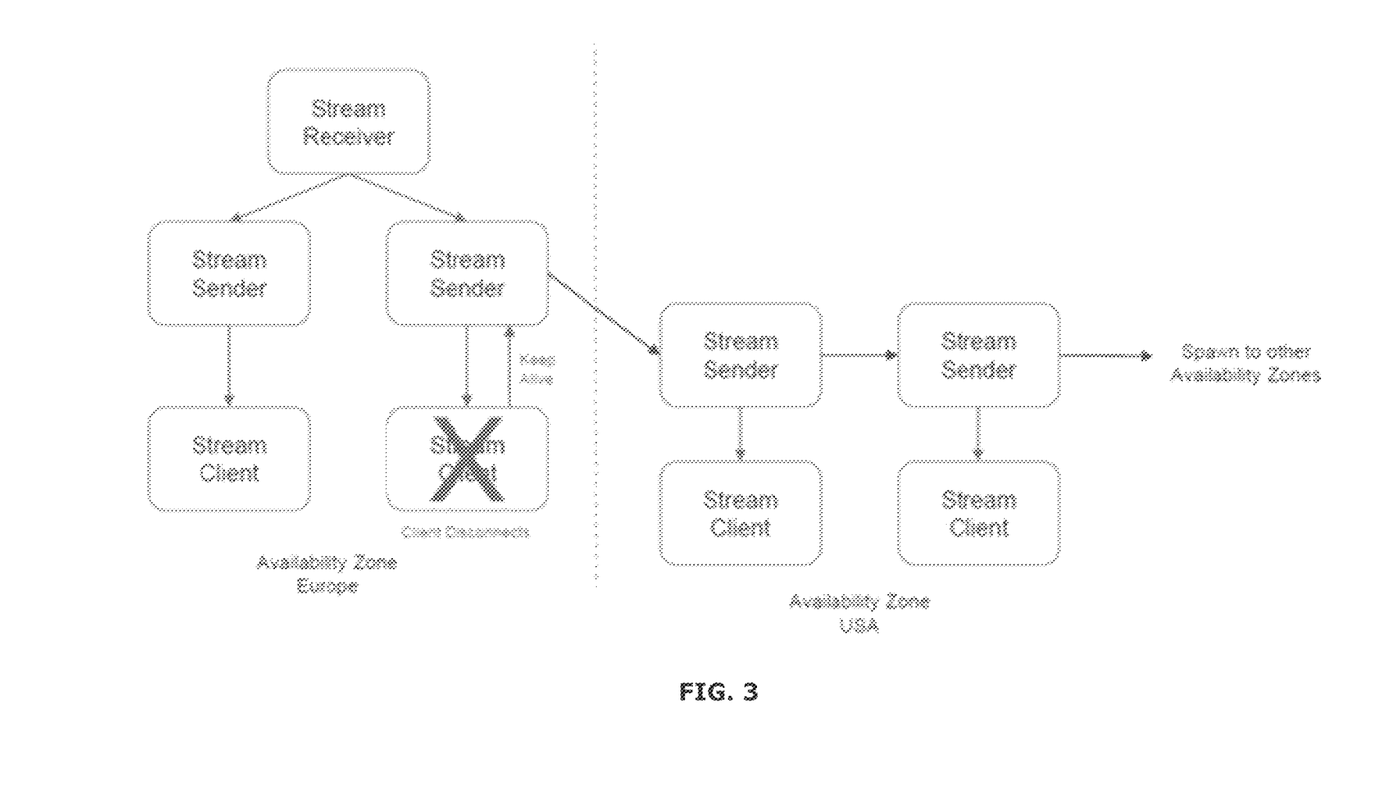
FIG. 3 shows a multiple level spawning tree.

FIG. 3 shows a multiple level spawning tree. The figure shows a first stream sender and a second stream sender in direct connection with a stream receiver. The first stream sender is shown connected with a stream client. The second stream sender is shown disconnected with the client previously using said stream sender. The second stream sender is shown in further connection with a first spawned stream sender in a different availability zone, which stream sender has a stream client. The first spawned stream sender is shown spawning a second spawned stream sender, which second spawned stream sender is shown being spawned and in connection with a stream client.

Figure 4:
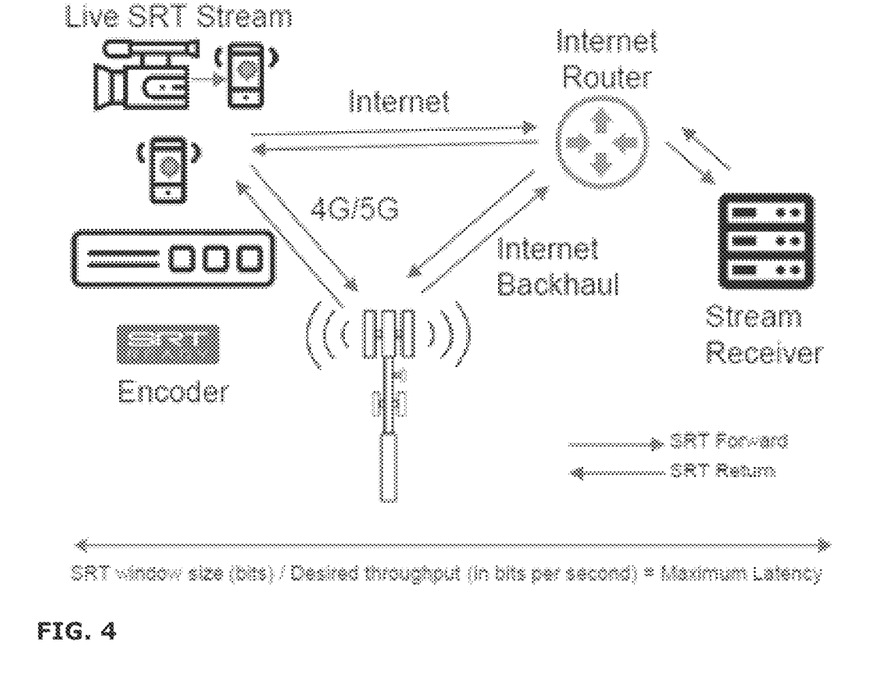
FIG. 4 schematically shows an embodiment of the system between a live secure reliable transport (SRT) stream capturing and encoding end and the first stream receiver.

FIG. 4 schematically shows an embodiment of the system between a live secure reliable transport (SRT) stream capturing and encoding end and the first stream receiver. This figure shows the live SRT stream capturing and encoding end having a first two-way communication with an internet router. A second two-way communication between the live SRT stream capturing and encoding end is shown comprising a two-way connection to a 4G/5G cell tower, which tower is shown in further two-way connection with the internet router via internet backhaul. The internet router is shown in further two-way connection with a stream receiver.

Figure 5:
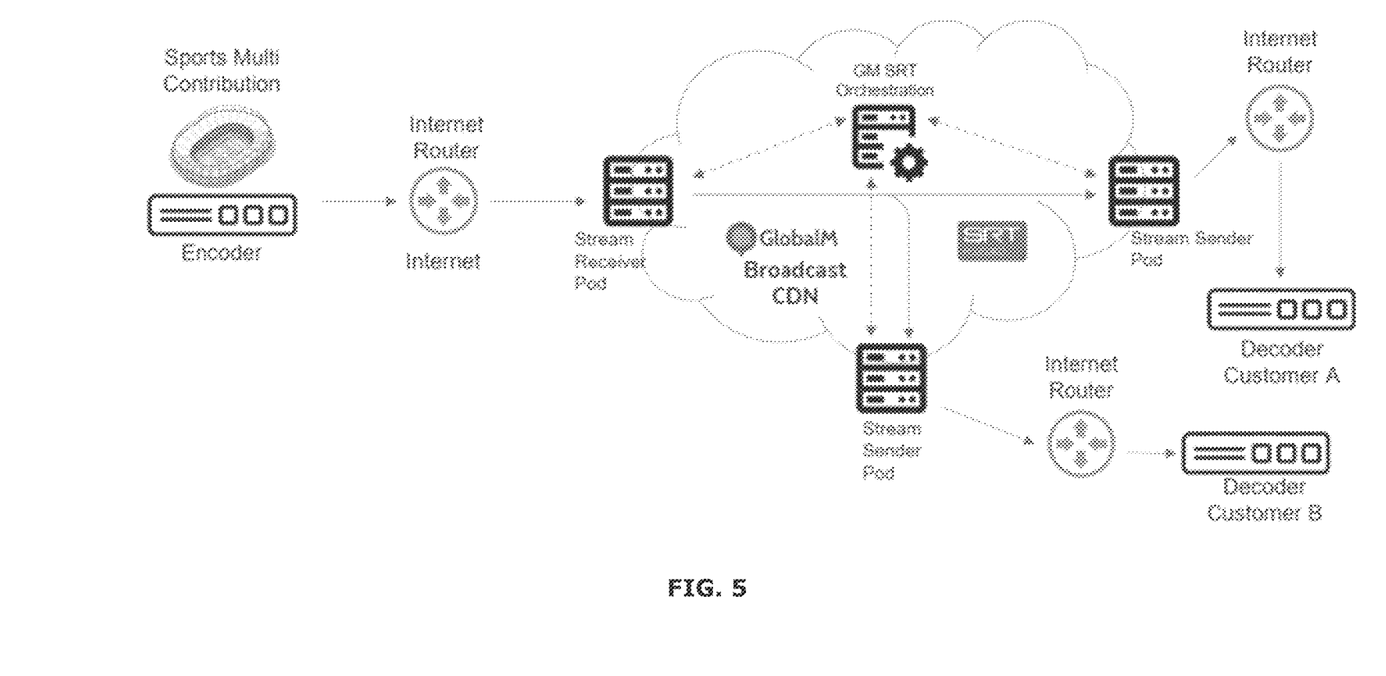
FIG. 5 shows an embodiment of the live streaming system used to distribute content from a multi-contribution feed.

FIG. 5 shows an embodiment of the live streaming system used to distribute content from a multi-contribution feed. A multiple feed processing encoder is shown in one-way contact with an internet router, which router is in further one-way contact with a stream receiver pod inside GlobalM Broadcast Content Delivery Network (CDN). The stream receiver pod is shown in further one-way contact with a first stream sender pod and a second sender pod. A GM SRT orchestration system is shown in two-way communication with the stream receiver pod, the first stream sender pod and the second stream sender pod. The first stream sender pod is shown in further one-way communication with an internet router, which router is in further one-way communication with a decoder customer A. The second stream sender pod is shown in further one-way communication with an internet router, which router is in further one-way communication with a decoder customer B.

Figure 6:
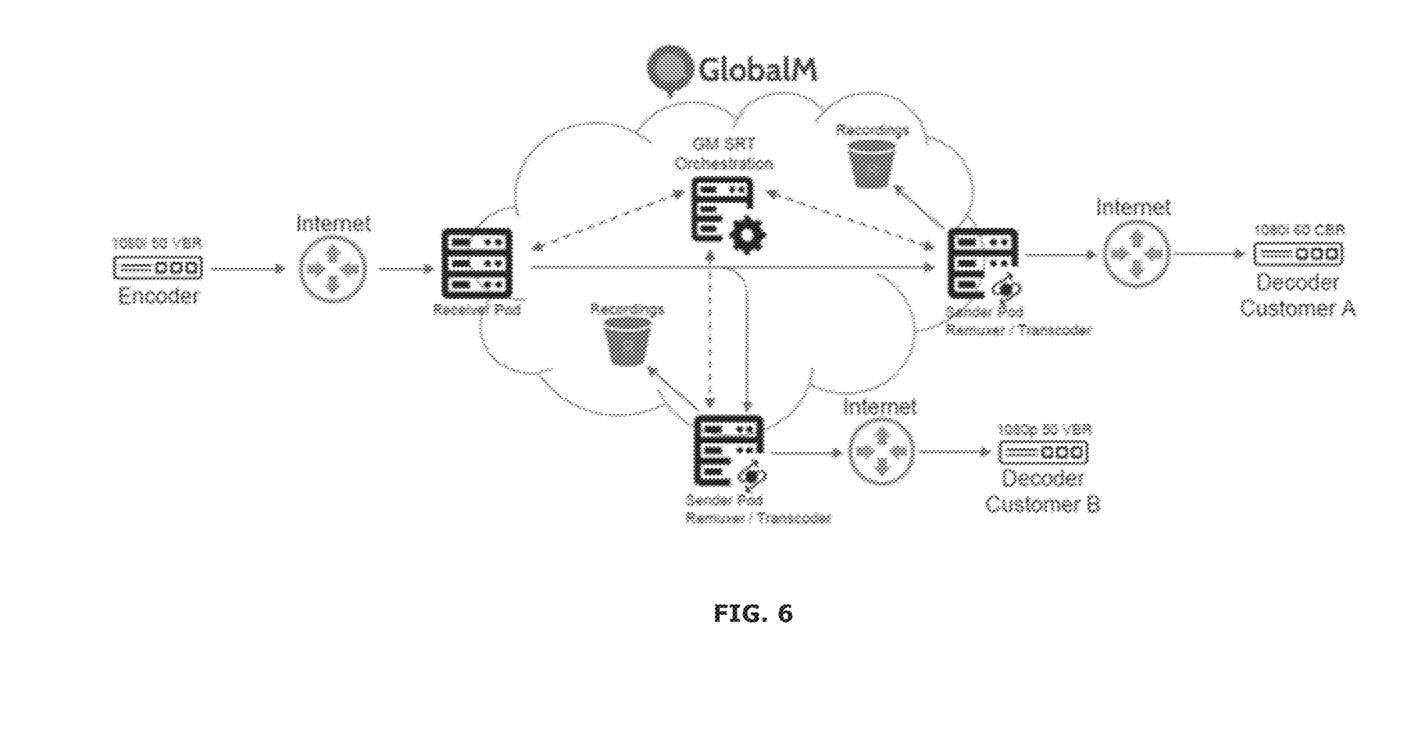
FIG. 6 shows an embodiment of the live streaming system used to distribute content from a single or multi-contribution feed.

FIG. 6 shows an embodiment of the live streaming system used to distribute content from a single or multi-contribution feed. A multiple or single feed processing encoder having a variable bitrate is shown in one-way contact with an internet router, which router is in further one-way contact with a stream receiver pod inside GlobalM Broadcast Content Delivery Network (CDN). The stream receiver pod is shown in further one-way contact with a first stream sender pod remuxer/transcoder and a second sender pod remuxer/transcoder. Each stream sender pod remuxer/transcoder is shown in connection with a video storage, in this case an S3 compatible object storage element. A GM SRT orchestration system is shown in two-way communication with the stream receiver pod, the first stream sender pod remuxer/transcoder and the second stream sender pod remuxer/transcoder. The first stream sender pod remuxer/transcoder is shown in further one-way communication with an internet router, which router is in further one-way communication with a constant bit rate decoder for customer A. The second stream sender pod remuxer/transcoder is shown in further one-way communication with an internet router, which router is in further one-way communication with a variable bit rate decoder for customer B.

Figure 7:
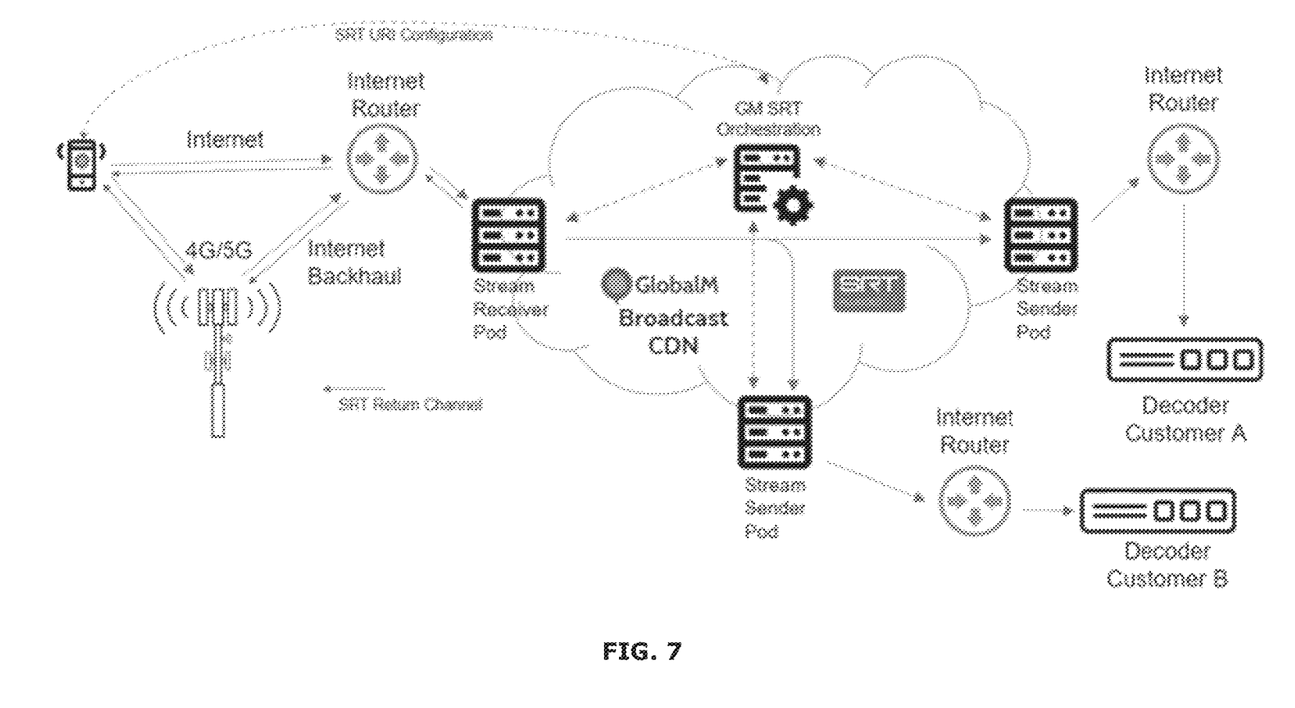
FIG. 7 shows an embodiment of the live streaming system used to distribute content captured using a mobile device.

FIG. 7 shows an embodiment of the live streaming system used to distribute content captured using a mobile device. The mobile device is shown having a two-way connection with an internet router via internet, said mobile device is also shown in two-way communication with a GM SRT orchestration system. Said mobile device is shown having a two-way connection with a 4G/5G antenna, which 4G/5G antenna is in further two-way connection with the internet router via internet backhaul. The router is shown in further two-way contact with a stream receiver pod inside GlobalM Broadcast CDN. The GM SRT orchestration system is shown in two-way communication with the stream receiver pod, the first stream sender pod and the second stream sender pod. The first stream sender pod is shown in further one-way communication with an internet router, which router is in further one-way communication with a decoder customer A. The second stream sender pod is shown in further one-way communication with an internet router, which router is in further one-way communication with a decoder customer B.

Figure 8:
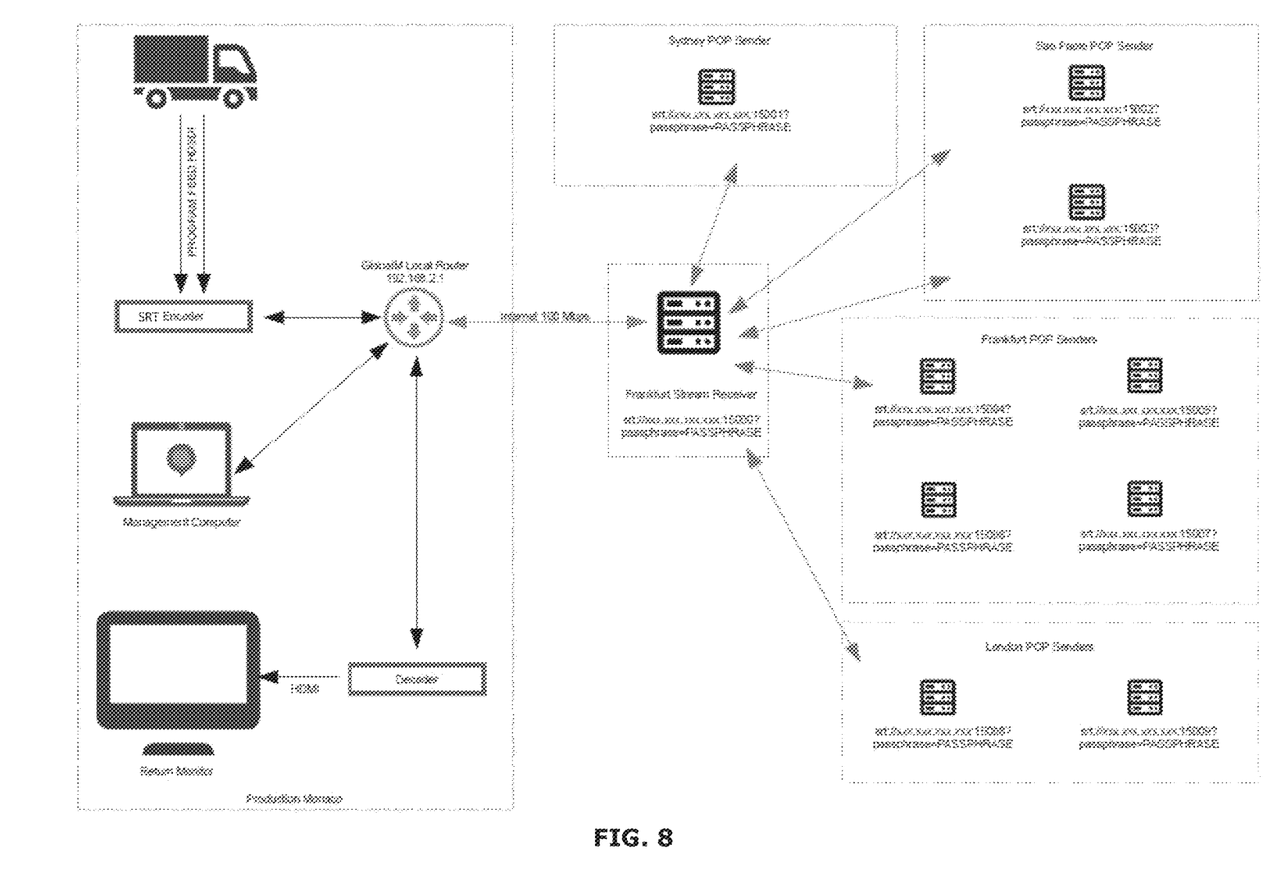
FIG. 8 shows a first example of the live streaming system used to distribute a sports event internationally.

FIG. 8 shows a first example of the live streaming system used to distribute a sports event internationally. An initial program feed is transmitted to a SRT Encoder via High-definition serial digital interface (HDSDI). The SRT Encoder is shown in further two-way communication with a GlobalM Local Router. The GlobalM Local Router is shown in further two-way connection with a Management Computer. Another two-way connection between the GlobalM Local Router and a SRT Decoder is shown, which SRT Decoder is shown connected to a monitor via HDMI. The GlobalM Local Router is shown connected via 100 Mbps internet to a Frankfurt Stream Receiver, which Frankfurt Stream Receiver is two-way connected to four local sender nodes: Sydney POP sender, Sao Paulo POP sender, Frankfurt POP sender and London POP senders.

It is supposed that the present invention is not restricted to any form of realization described previously and that some modifications can be added to the presented example without reappraisal of the appended claims. For example, the present invention has been described referring to live streaming, but it is clear that the invention can be applied to non-live streaming for instance or to the distribution of live audio, non-live audio or even to other types of data distribution.

The present invention is in no way limited to the embodiments described in the examples and/or shown in the figures. On the contrary, methods according to the present invention may be realized in many different ways without departing from the scope of the invention.

The invention claimed is:

1. A cloud-based live broadcasting system employed in combination with a media capture device in communication with an encoder, the cloud-based live broadcasting system comprising:
   a plurality of streaming resources; and
   a control module configured to manage said streaming resources,
   wherein the streaming resources include a plurality of pods, each pod being functionally reconfigurable to function as any one of: a stream receiver; a stream sender; or a transcoder based on a function assigned to the pod,
   wherein each pod includes a stream service controller that assigns the function to the pod in which it is included, respectively,
   wherein the plurality of pods are arranged in nodes,
   wherein each of the nodes includes a group of pods included in the plurality of pods,
   wherein the nodes are grouped in scalable clusters, and
   wherein, for each scalable cluster, the control module is configured to adjust a quantity of nodes included in the scalable cluster in response to changes in demand in the scalable cluster, respectively, by either adding or removing nodes, the addition of nodes introducing redundant pods into the system.

2. The cloud-based live broadcasting system according to claim 1,
   wherein the plurality of pods includes a stream receiver pod and a plurality of stream sender pods; and
   wherein the stream receiver pod is configured to function as a stream receiver to: receive an encoded stream from the encoder, the encoded stream including a stream captured by the media capture device and encoded by the encoder; and distribute the encoded stream to the plurality of stream sender pods, the stream sender pods configured as stream senders for distributing the encoded stream to a plurality of stream clients.

3. The cloud-based live broadcasting system according to claim 2, wherein the control module is configured to add nodes to a first scalable cluster included in the scalable clusters according to a quantity of stream clients whose live stream depends on the first scalable cluster, the nodes added to the first scalable cluster making stream sender pods available.

4. The cloud-based live broadcasting system according to claim 1, wherein the control module includes an application programing interface, the application programming interface in communication with a service orchestration system.

5. The cloud-based live broadcasting system according to claim 4, wherein the service orchestration system communicates with the stream service controller of each pod included in the plurality of pods.

6. The cloud-based live broadcasting system according to claim 4, wherein the service orchestration system is configured to adjust the quantity of nodes within each scalable cluster.

7. The cloud-based live broadcasting system according to claim 1, wherein a function is assigned to a pod to reconfigure the pod in response to changes in content demand on the cloud-based live broadcasting system.

8. The cloud-based live broadcasting system according to claim 1, wherein the control module is configured to automatically adjust the quantity of nodes included in each scalable cluster.

9. The cloud-based live broadcasting system according to claim 1, wherein each of the nodes includes a fixed number of pods.

10. The cloud-based live broadcasting system according to claim 1, wherein a stream service controller of a first stream sender pod receives instructions to cause a second stream sender pod to be spawned from the first stream sender pod.

11. The cloud-based live broadcasting system according to claim 10, wherein the first stream sender pod is kept alive when a client disconnects from the first stream sender pod when the second stream sender pod still depends on the first stream sender pod.

12. A method of broadcasting live stream using a cloud-based live broadcasting system in combination with a media capture device in communication with an encoder, the method comprising the steps of:
   a. providing a plurality of streaming resources and a control module configured to manage said streaming resources, wherein said streaming resources include a plurality of pods, each pod including a stream service controller;
   b. configuring each pod to be functionally reconfigurable to function as any one of: a stream receiver; a stream sender; or a transcoder based on a function assigned to the pod;
   c. for each pod of the plurality of pods, assigning the function to the pod by the stream service controller included in the pod, respectively;

d. arranging the plurality of pods in nodes, wherein each of the nodes includes a group of pods included in the plurality of pods;
e. grouping the nodes in scalable clusters; and
f. configuring the control module to, for each scalable cluster, adjust a quantity of nodes included in the scalable cluster in response to changes in demand in the scalable cluster, respectively, by either adding or removing nodes, the addition of nodes introducing redundant pods into the system.

13. The method according to claim 12, wherein the encoder communicates with a local internet router directly via a network including at least one of the Internet and/or a 4G/5G network with internet backhaul, and
wherein the local internet router is in further communication with a stream receiver pod included in the plurality of pods.

14. The method according to claim 12, further comprising adding a new node in a first cluster included in the scalable clusters when the first cluster is reaching a capacity limit.

15. The method according to claim 12, further comprising:
including a stream receiver pod and a plurality of stream sender pods in the plurality of pods;
configuring the stream receiver pod to function as a stream receiver to: receive an encoded stream from the encoder, the encoded stream including a stream captured by the media capture device and encoded by the encoder; and distribute the encoded stream to the plurality of stream sender pods; and
configuring the stream sender pods as stream senders for distributing the encoded stream to a plurality of stream clients.

16. The method according to claim 15, further comprising adding a quantity of nodes to a first cluster included in the scalable clusters according to a quantity of stream clients whose live stream depends on the first cluster, the nodes added to the first scalable cluster making stream sender pods available.

17. The method according to claim 15, further comprising calculating latency values by the stream receiver pod based on an actual received bandwidth.

18. The method according to claim 12, further comprising assigning a function to a pod to reconfigure the pod in response to changes in content demand on the cloud-based live broadcasting system.

19. The method according to claim 12, further comprising automatically adjusting the quantity of nodes included in each scalable cluster.

20. The method according to claim 12, further comprising including a fixed number of pods in each of the nodes.

21. The method according to claim 12, further comprising receiving at a stream service controller of a first stream sender pod instructions to cause a second stream sender pod to be spawned from the first stream sender pod.

22. The method according to claim 21, wherein the first stream sender pod is located in a first availability zone, and wherein the method further comprises locating the second stream sender pod in a second availability zone, the second availability zone being a different availability zone than the first availability zone.

23. The method according to claim 21, wherein the first stream sender pod is kept alive when a client disconnects from the first stream sender pod when the second stream sender pod still depends on the first stream sender pod.

24. The method according to claim 12, further comprising:
receiving an encoded video stream at a stream receiver pod included in the plurality of pods via a local internet router;
distributing an encoded video stream received by the stream receiver pod to a plurality of stream sender pods included in the plurality of pods in each availability zone cluster in multiple geographical zones;
adjusting a quantity of nodes per availability zone cluster; and
distributing the encoded video stream from the stream sender pods to a plurality of stream clients in each availability zone within each geographical zone.

* * * * *